(12) United States Patent
Jeffers et al.

(10) Patent No.: US 6,381,307 B1
(45) Date of Patent: Apr. 30, 2002

(54) METHOD AND APPARATUS FOR PROVIDING ALARM SECURITY RECEIVER WITH DIALED NUMBER AND CALLER I.D.

(75) Inventors: John Jeffers, Newmarket; Dean Dubblestein, Willowdale; Seiran Petikian, Scarborough, all of (CA)

(73) Assignee: Sur-Gard Security Systems LTD, Downsview ( * ) Notice: Subject to any disclaimer, the term of this patent is extended or adjusted under 35 U.S.C. 154(b) by 0 days.

(21) Appl. No.: 09/597,717

(22) Filed: Jun. 19, 2000

(51) Int. Cl.[7] .............................................. H04M 1/56
(52) U.S. Cl. ................................................ 379/42.01
(58) Field of Search ....................... 379/142.01, 160.01, 379/106.02, 106.03, 142.04, 40, 39, 46, 47, 49, 51

(56) References Cited

U.S. PATENT DOCUMENTS 4,499,455 A * 2/1985 Leve'lle et al. .............. 340/531
6,014,426 A * 1/2000 Drysdale et al. .............. 379/33

* cited by examiner

*Primary Examiner*—Huyen Le
*Assistant Examiner*—Rexford Barnie

(57) ABSTRACT

An ISDN or other enhanced bulk delivery telephone signal i processed by a channel bank receiver to preferrably produced a plain old telephone signal output having dialed number and caller I.D. as lead information. This signal is advantageously used by a security station receiver to distinguish different calling alarm panels which may not be uniquely identified by their own address. This information also allows more effective processing of telephone signals received by the security station.

3 Claims, 4 Drawing Sheets

NETWORK RECEIVER

METHOD AND APPARATUS FOR PROVIDING ALARM SECURITY RECEIVER WITH DIALED NUMBER AND CALLER I.D.

FIELD OF THE INVENTION

The invention relates to receivers for use in receiving and communicating with security system alarm panels and in particular, to a procedural method and apparatus for providing a security receiver with additional information as part of the telephone communication with an alarm panel.

BACKGROUND OF THE INVENTION

Security system alarm panels are very common and normally report by telephone to a central security station when an alarm condition or event has been detected or on a pre-arranged basis. The securing station typically receives telephone communications from alarm panels of different types and recently for cost efficiencies, there is a tendency for the central station to consolidate the receiving and processing function by combining several security stations. The reporting systems can be unrelated as well.

With this consolidation, the codes previously used to uniquely identify a particular alarm panel may no longer be unique to that particular alarm panel. The individual alarm panels could perhaps be reprogrammed with a unique number, however, this would be time consuming and expensive. Rather than attempting to change the host of existing alarm panels such that each is uniquely identified, steps have been taken to have the central station uniquely identify the alarm panels by using additional information provided by the telephone company with each telephone signal.

Caller I.D. information (preferably the originating telephone number) is provided by the telephone provider. The various telephone companies offer caller I.D. as an upgrade to the basic telephone service, however, in some cases, this information is blocked as requesting by the calling party. Therefore, caller I.D. information is not always available and therefore, using this additional information as part of the unique identification of an alarm panel is not always practical. The dialed telephone number is within the control of the security station, in that it can have a number of direct indial (DID) numbers, and these numbers can be assigned to alarm panels of distinct groups. In this way, each alarm panel within a group is uniquely identified by its original address.

The dialed number ((DN) and the telephone number of the calling alarm panel are useful to the universal receiver as outlined in our earlier application. The combined information (DN, Caller I.D. telephone number) can be inserted in the telephone signal like caller I.D., preferably between the first and second rings of a plain old telephone signal (POTS) and processed by a universal receiver. It has been found that this combined information is not a common request of telephone companies and therefore, this information is not available from telephone companies in a cost effective manner. Caller I.D. information alone, is not as effective as it is not always provided. As can be appreciated, there are a host of alarm panels in existence which communicate with central stations and those central stations have universal receivers which are capable of answering alarm panels of different protocols. The present invention provides a cost effective device and method for providing the information to a universal receiver of a security station.

SUMMARY OF THE INVENTION

The present invention is directed to a method of providing a security station receiver with caller I.D. and dialed number information as part of an ordinary telephone signal. The method comprises using an enhanced bulk delivery telephone service to receive telephone signals from a host of alarm panels in the bulk signal, using a channel bank receiver to process the bulk signal and convert the bulk signal into a series of ordinary telephone signals with dialed number and caller I.D. information included in the signal.

According to an aspect of the invention the dialed number and the caller I.D. information is provided between the first and second ring of the signal.

According to a further aspect of the invention, the ISDN signal is provided to the channel bank receiver on one channel and the receiver distributes the signal with the appropriate information to one of a series of channels with the receiver adding the caller I.D. and dialed number information in the signal between the first and second rings.

The invention is also directed to a channel bank receiver in combination with a security station receiver. The channel bank receiver includes an input channel for receiving an ISDN signal or other enhanced bulk delivery signal from a telephone system. This signal is divided by the receiver using a series of channels where each channel is provided with the dialed number and the caller identification information, and inserts this information like caller I.D. preferably between a generated first ring and a generated second ring with the channel then receiving the analogue signal of the calling party. This produces an ordinary signal output on any of the channels which can be picked up by the security station receiver. The telephone signal has the dialed number and the caller identification information provided in the signal between the first and second ring. This is similar to caller I.D. information that can be provided by a telephone company in a conventional signal. In contrast, the desired information is provided between the first and second ring after the information has been selected from the information provided in the bulk signal for each telephone signal.

According to yet a further aspect of the invention, the security station receiver uses the caller I.D. and the dialed number information in combination with the address provided by the alarm panel to uniquely identify the alarm panel.

According to yet a further aspect of the invention, the receiver compares the caller I.D. information to determine whether the calling party continues to subscribe to the reporting service and effectively, disconnects or alternately processes the call if service has been discontinued.

According to yet a further aspect of the invention, the universal receiver compares the provided caller I.D. information with a reference data base of caller I.D. information and modifies the signal processing if the caller I.D. information has changed. This can be used to identify problems such as non-reported changes of location.

BRIEF DESCRIPTION OF THE DRAWINGS

Preferred embodiments of the invention are shown in the drawings, wherein.

DETAILED DESCRIPTION OF THE PREFERRED EMBODIMENTS

The system 2 uses the universal receiver 4 for processing calls received telephone signals from different alarm panels. The alarm panels can be of different types where each type requires a particular communication protocol. The first group of receivers is shown as 6, the second group of receivers is shown as 8 and the third group of receivers is shown as 10.

Figure 4:
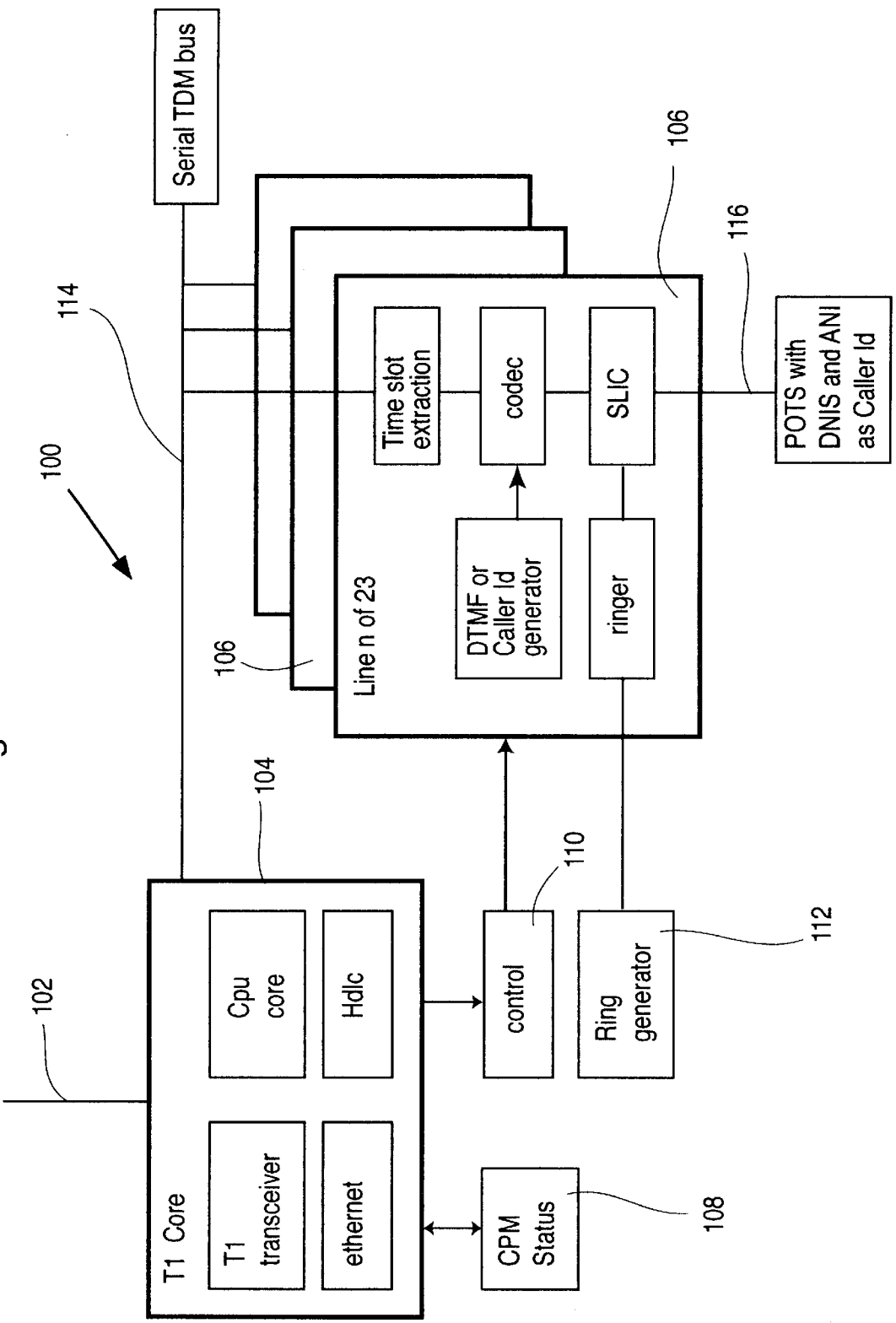
FIG. 4 shows the channel bank receiver used to process and distribute telephone signals to the universal receiver by providing the dialed number and caller I.D. information as part of the plain old telephone signal provided to the universal receiver.

It can be appreciated that there can be many different groups of receivers and these receivers communicate with the universal receiver via direct in-dial (DID) telephone lines associated with the security station. These direct in-dial lines are assigned to distinguish between different groups of receivers. In this way, the universal receiver 4, when picking up a call on one of the telephone lines 12, will receive the dialed telephone number and this number can be used by the universal receiver to identify the type or group of alarm panels that originated the call. The preferred arrangement for providing the dialed telephone number and caller I.D. telephone number is explained with respect to FIG. 4.

The universal receiver, upon answering the call, is provided with the dialed number and the telephone number of the calling alarm panel preferably between the first and second ring. The dialed number and/or caller I.D. information are used to access a protocol database 14, which maintains the particular communication parameters of the protocol necessary to appropriately program the universal receiver for communication with that type of alarm panel. Thus, the universal receiver retrieves the communication parameters and uses these parameters to configure the receiver to communicate with the alarm panel according to the communication protocol of the alarm panel. In this way, there can be different groups of alarm panels, all of which communicate with a universal receiver which adopts the correct protocol for the alarm panel which initiated the communication. Thus, the universal receiver is reconfigured and there is no necessity to change all of the alarm panels to a common communication protocol. The system is also easily expanded when a different type of alarm panel is added to the system.

This provided information can also be used for identifying problem situations such as discontinued monitoring services or possible relocation of alarm panels, as two examples.

The universal receiver can also receive from the protocol database further information to add to the particular alarm panel information to allow independent recognition of this communication in the database 16. Basically, the universal receiver receives the communication and then forwards it to the database 16 for further processing. By adding the additional information, each alarm panel that has communicated with the universal receiver can be uniquely identified in the database including all alarm panels served by the universal receiver even though different systems have the same identification. The system adds a suffix or prefix to provide the unique identification without changing the identification of the alarm panel.

Figure 1:
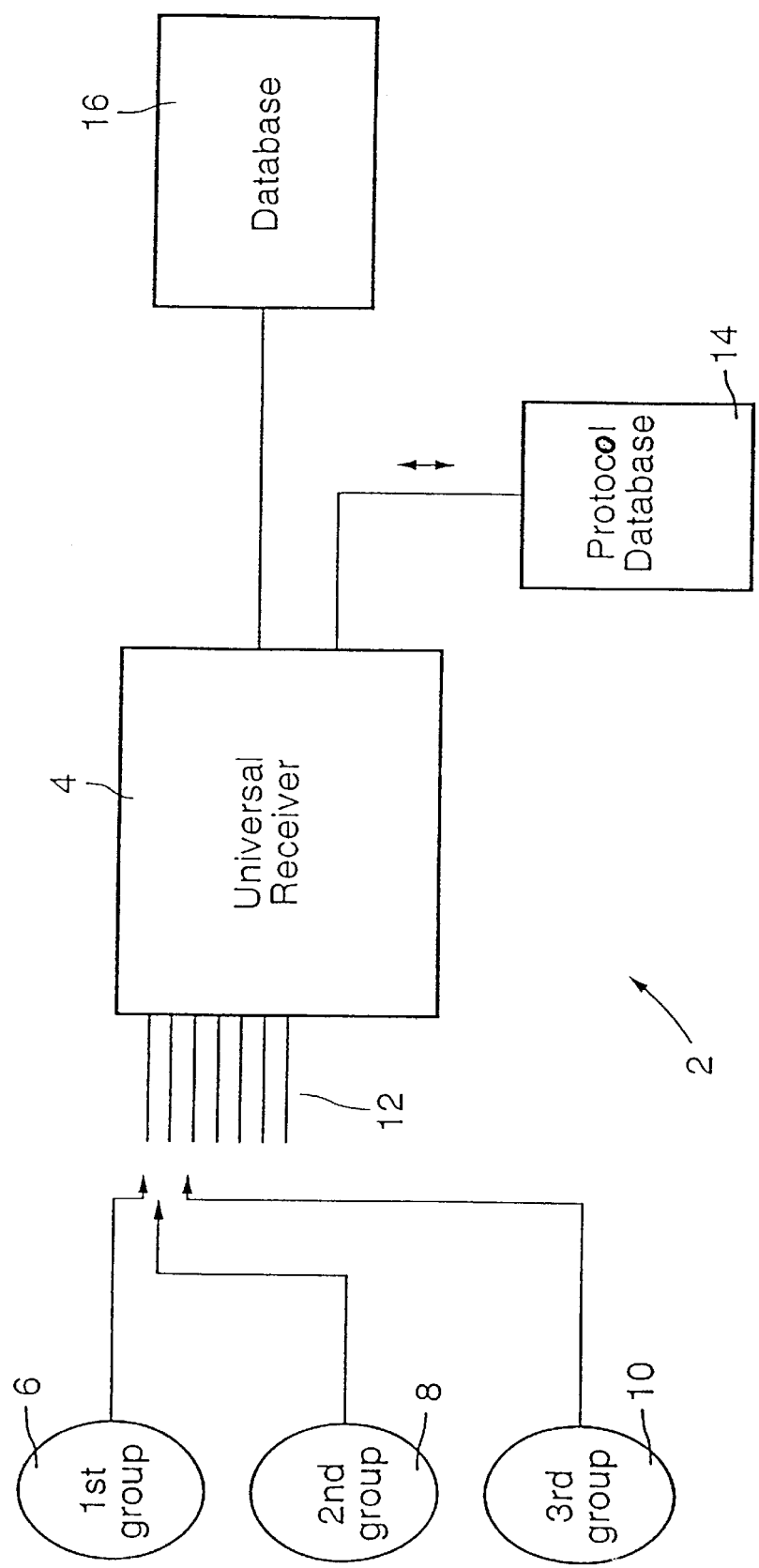
FIG. 1 is a general overview showing different alarm panel types in a cooperation with the universal receiver.
Figure 2:
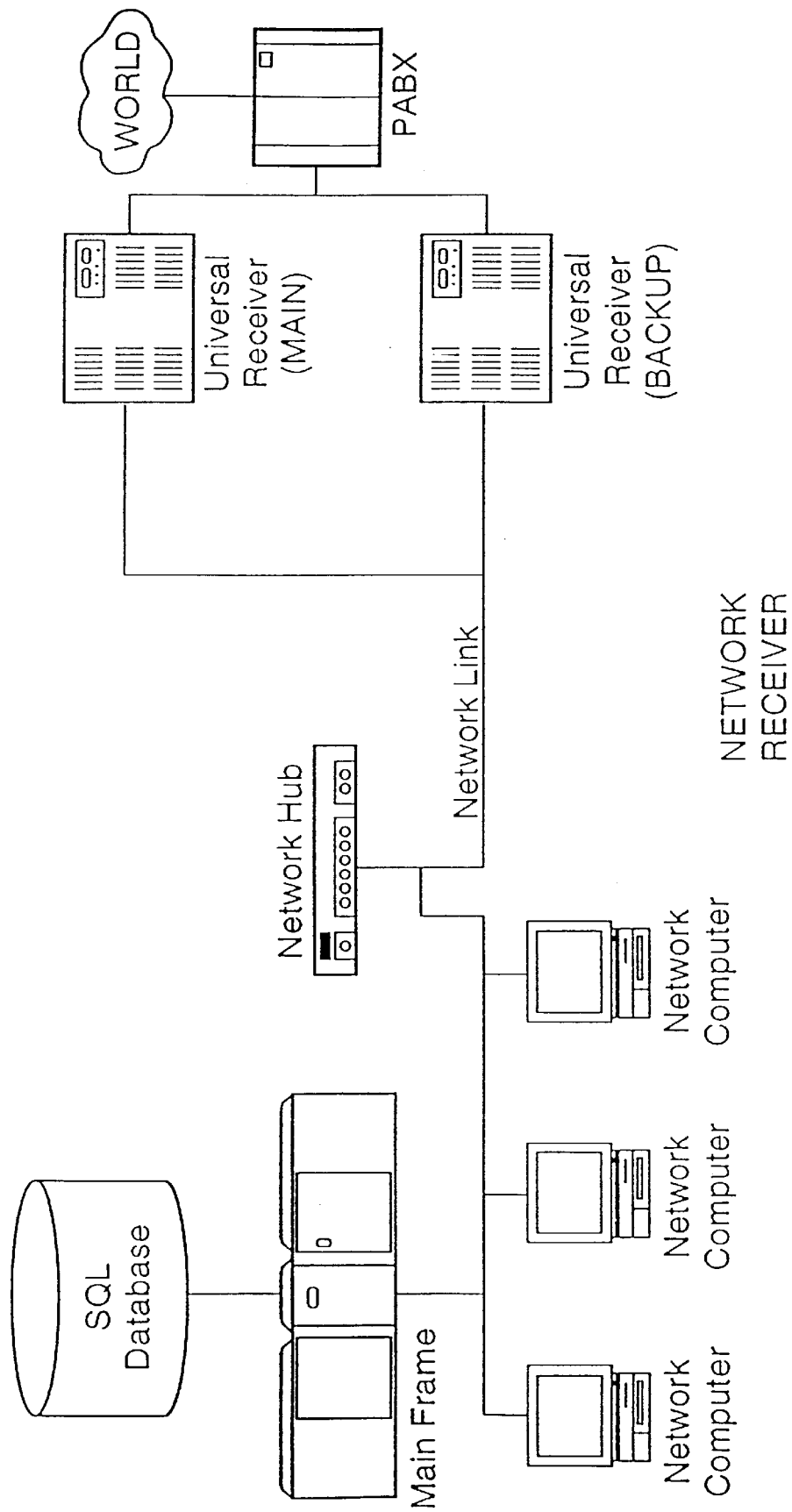
FIG. 2 shows an enhancement of the system where the universal receiver is part of a network.
Figure 3:
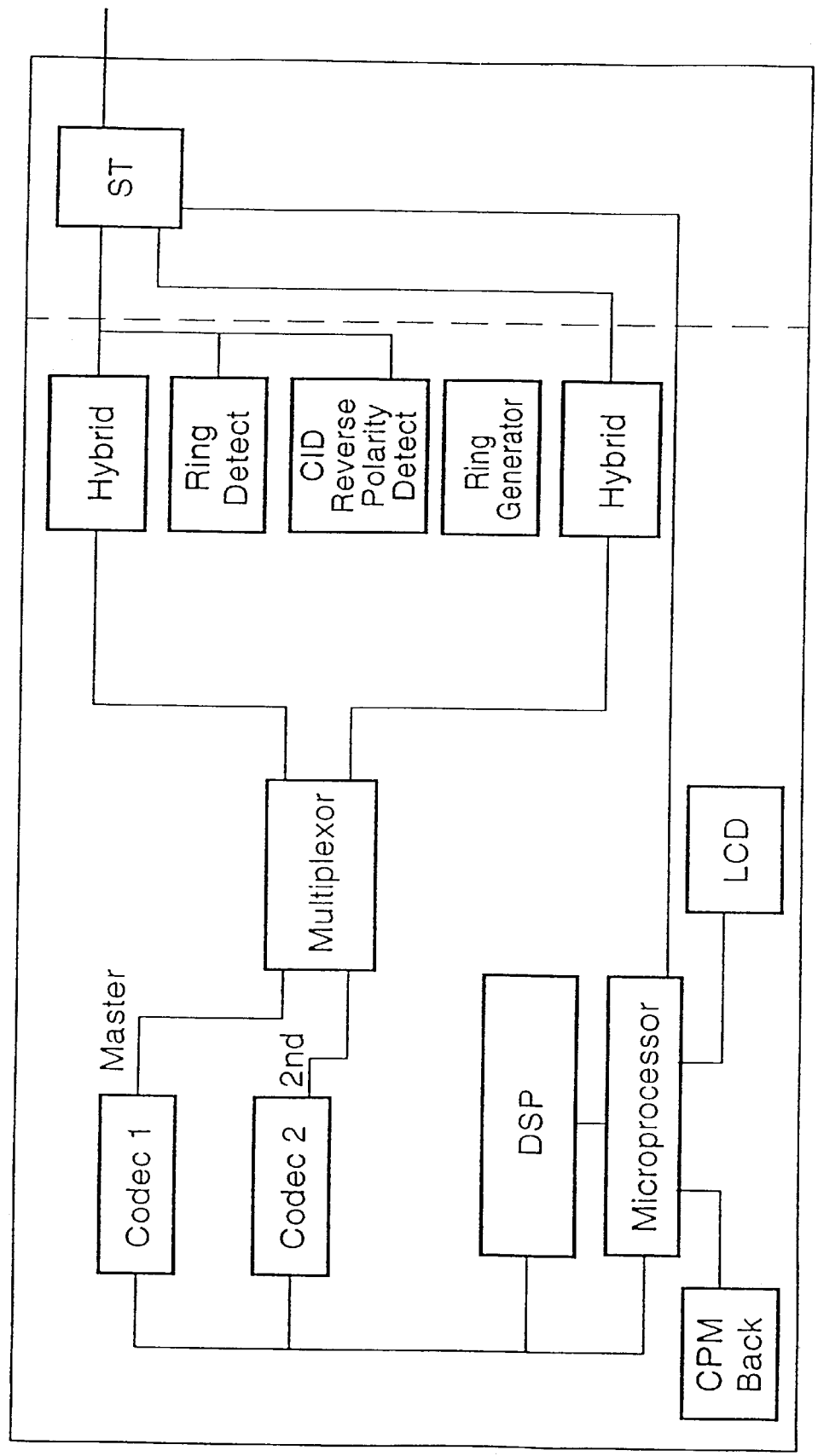
FIG. 3 shows further details of the universal receiver.

With the above arrangement, it can be appreciated that the direct in-dial numbers 12 effectively service all of the alarm panels, and therefore, the total number of lines required to service these alarm panels is reduced relative to a system where certain lines are dedicated to serving particular alarm panel types. FIG. 1 clearly shows how all communications from the different types of receivers are basically fed to the universal receiver on the first available channel. With this arrangement, the number of lines required for servicing of the different alarm panel types is kept to a minimum or reduced number. Furthermore, the universal receiver advantageously adds an account prefix on the front end of the message received from the alarm panel to uniquely identify the alarm panel relative to the total number of alarm panels being serviced. In this way, each communication and each alarm panel is uniquely identified in the database 16.

With the present invention, it is possible to have a control call center equipped with universal receivers 4 where the call center has less telephone lines than other control centers where dedicated or partially dedicated receivers are used. This system also allows reduction in the total number of receivers necessary for servicing of the alarm panels, as the telephone lines are pooled and the universal receivers are also pooled.

From the above, it can be understood that it is desirable to provide the dialed number information as well as caller I.D. information as additional information which is provided to the receiver as part of a plain old telephone signal (POTS) which is processed by the universal receiver. As can be appreciated, there are many security stations having universal receivers and it would be desirable to continue to communicate with these universal receivers using a plain old telephone signal.

The dialed number and the caller I.D. information can be the calling number or the name and it is desirable to provide this information combined in a cost effective manner. This information is certainly available to the telephone companies, however, it is not usually combined in this manner as part of header information which is inserted in the signal, such as between the first and second rings of the telephone line signal. The telephone companies provide this service, with respect to caller I.D. information. The direct in-dial number information is, typically lost when a receiver picks it up. Furthermore, the telephone companies have not to date, provided this combined information as part of a plain old telephone signal.

This information is available as part of enhanced bulk delivery telephone services. For example, this information, as well as additional information, is available to an ISDN subscriber. A channel bank receiver 100 of FIG. 4 has one channel 102 for receiving the ISDN signal. The primary rate processor 104 serves to receive the signal and effectively distributes the ISDN signal to one of the 23 channels indicated as 106.

The CPM 108 is connected to the processor 104 and provides instructions to the various channels 106 to insert the dialed information which has been stripped from the ISDN signal (i.e., the dialed number and the caller I.D.). This stripped information is provided to one of the channels 106 by the control unit 110.. The control unit 110 also instructs the particular channel of the time slot and extraction particulars of the received voice signal. The particular channel 106 then combines the modified caller I.D. information, i.e., the dialed number information separated from caller I.D. information, both of which are provided between the first ring and the second ring of the signal.

The ring generator 112 provides the necessary ring signals. With this structure, the modified caller I.D. information and the ring signals are combined with the audio data which is available on line 114 which is fed to each of the channels 106. The particular channel the combines the audio signal with the modified caller I.D. signal and the ring generators and produces an output signal on line 116. This is in the form of a POTS (plain old telephone signal) output with the dialed number and the caller I.D. information provided between the first and second ring. As can be appreciated, the universal receiver cooperates with each of the channels 106 and effectively processes the modified telephone signals.

Advantageously, the system as described above, subscribes to an enhanced bulk delivery service such as ISDN services of a telephone company, which services include dialed number and caller I.D. information as part of a larger packet of information associated with each telephone signal. The channel bank receiver 100 appropriately distributes the signal for processing of each communication on one of the 23 channels 106 and modifies the information to recreate a POTS output which can be provided to the universal receiver. The channel bank receiver has reconstructed the plain old telephone signal, has inserted the necessary conditioning such as first and second rings, that the universal receiver is anticipating, and has inserted the dialed number and caller I.D. information in a predetermined manner. This arrangement is particularly advantageous in that it allows adaption of existing universal receivers in a cost effective manner to provide the modified caller I.D. information. This approach allows the universal receiver to uniquely identify particular calling alarm panels in that the dialed number information is always available and is used to distinguish one group of alarm panels from a different group of alarm panels.

The channel bank receiver is compatible with the various telephone services providers in that ISDN or other such services are generally standardized and therefore, little modification of the receiver is required for different systems environments. In North America, caller I.D. information is provided between the first and second rings, however, other countries provide this lead information in a slightly different manner. The modified caller I.D., i.e, dialed number and caller I.D. number, is inserted in the most appropriate manner for receipt by the universal receiver. This information can be inserted using DTMF, FSK, or other inband signal methods, appropriate for the universal receiver.

Furthermore, it has been found that most telephone companies provide a Primary Rate ISDN service where the additional information is standardized and the particular location of each piece of information is standardized. This allows the channel bank receiver to be suitable for a host of applications with very little change if any, for different locations.

The dialed number information is more complete than DNIS information. DNIS information is typically the last four digits of the telephone number. The dialed number in the preferred embodiment is the complete dialed number.

The above approach defines a simple method and apparatus for providing enhanced information to a universal receiver as part of a POTS output and without negotiating with the various telephone providers to provide the desired information between the first and second rings of a conventional signal. The invention recognizes that the various telephone providers generally have the same ISDN or other standard and the information desired is part of this larger block of information. The channel bank receiver with the particular logic and control allows this ISDN signal to be processed into the individual telephone signals and to be recombined with a first and second ring signals with the desired information inserted between these ring signals followed by the eventual telephone signal that is being sent by the alarm panel.

It is preferred that the dialed number be provided first, and if available, the calling party number will follow. The channel bank receiver typically receives a T1 or T1/E1 ISDN service and extracts the desired information from the signal. The channel bank receiver distributes the ISDN signal to produce a series of signals and combines the desired information into each of the signals for output from the receiver, as a POTS output.

The invention extracts the originally dialed number and calling party number from the enhanced bulk delivery channel such as T1, E1, ATM, ISDN, TCP, IP, SONET or SS7 signal. The receiver then places output of DTMF digits of originally dialed number, flag, calling party number, check digit and flag as a preface to the POTS connection for a security receiver.

In a different embodiment of the invention, the originally dialed number and calling party number are extracted from the enhanced bulk delivery channels such as T1, E1, ATM, ISDN, TCP, IP, SONNET or SS7. The originally dialed number is placed, followed by a flag, followed by the calling number, check digit into any North American or European caller I.D. which is a dialed number in the calling field and the calling party in the name field. The dialed number and the calling party number are placed in the plain old telephone signal between the first and second ring and provided to the security receiver.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follow:

1. A channel bank receiver in combination with a security station receiver, aid channel bank comprising an input for receiving an enhanced bulk delivery channel signal from telco, a plurality of line channels for processing separate telephone signals provided in said signal to extract dialed numbers and caller I.D. information of the particular telephone signal, each line channel additionally processing the telephone signal to convert the telephone signal to a POTS telephone signal and associating aid extracted dialed number and caller I.D. information with the converted signal, said channel bank receiver including an output connected to said security station receiver which receives said extracted information and said converted signal and appropriately process the converted signal as a function of said extracted information, and wherein the converted signal of each line channel includes a first ring signal followed by said extracted information which is followed by second ring signal; said security station receiver using said caller I.D. information a part of the identifcation of the calling alarm panel and compares aid DNIS information with a stored DNIS information of alarm panels which are to be processed in a different manner and separately processing the signals when a match is determined.

2. A channel bank receiver as claimed in claim 1 wherein when a match is determined said signal is blocked and not provided to aid security station receiver.

3. A channel bank receiver in combination with a security station receiver, said channel bank comprising an input for receiving an enhanced bulk delivery channel signal from a telco, a plurality of line channels for processing separate telephone signals provided in said signal to extract dialed numbers and caller I.D. information of the particular telephone signal, each line channel additionally processing the telephone signal to convert the telephone signal to a POTS telephone signal and associating said extracted dialed number and caller I.D. information with the converted signal, said channel bank receiver including an output connected to said security station receiver which receives said extracted information and said converted signal and appropriately processes the converted signal as a function of said extracted information, and wherein the converted signal of each line channel includes a first ring signal followed by said extracted information which is followed by a second ring signal; said security station receiver using both said caller I.D. information and said extracted dialed number as part of a process for selecting a communication protocol of a plurality of communication protocols available to said receiver.

* * * * *